United States Patent
Scanlan (10) Patent No.: US 6,857,022 B1
(45) Date of Patent: Feb. 15, 2005

(54) TRANSLATION ORDERING SYSTEM

(75) Inventor: Phillip Lee Scanlan, Brisbane (AU)

(73) Assignee: Worldlingo.com PTY LTD (AU)

(*) Notice: Subject to any disclaimer, the term of this patent is extended or adjusted under 35 U.S.C. 154(b) by 647 days.

(21) Appl. No.: 09/676,690

(22) Filed: Sep. 29, 2000

(30) Foreign Application Priority Data

Feb. 2, 2000 (AU) .............................................. PQ5397

(51) Int. Cl.[7] .............................................. G06F 15/16
(52) U.S. Cl. ...................... 709/229; 709/203; 709/226; 704/3; 704/6; 704/7
(58) Field of Search ................................ 709/200, 203, 709/225, 227, 229, 226; 704/3, 6, 7

(56) References Cited

U.S. PATENT DOCUMENTS

| | | | | |
|---|---|---|---|---|
| 5,323,310 A | * | 6/1994 | Robinson ........................ | 704/2 |
| 5,497,319 A | * | 3/1996 | Chong et al. ................... | 704/2 |
| 5,903,760 A | * | 5/1999 | Farber et al. ................. | 717/146 |
| 6,021,426 A | * | 2/2000 | Douglis et al. ............. | 709/200 |
| 6,026,375 A | * | 2/2000 | Hall et al. ..................... | 705/26 |
| 6,119,078 A | * | 9/2000 | Kobayakawa et al. ......... | 704/3 |
| 6,205,418 B1 | * | 3/2001 | Li et al. ......................... | 704/8 |
| 6,275,789 B1 | * | 8/2001 | Moser et al. .................. | 704/7 |
| 6,360,273 B1 | * | 3/2002 | Beurket et al. ............. | 709/244 |
| 6,600,725 B1 | * | 7/2003 | Roy ........................... | 370/261 |
| 2002/0091509 A1 | * | 7/2002 | Zoarez et al. .................. | 704/6 |

FOREIGN PATENT DOCUMENTS

JP       11282848 A  * 10/1999  .......... G06F/17/28

* cited by examiner

Primary Examiner—Hosain Alam
(74) Attorney, Agent, or Firm—Madson & Metcalf (57) ABSTRACT

A method of ordering a translation of an electronic communication, such as a web page or an email, using a one-click translation component displayed on the web page or in the email. Clicking the one-click translation component automatically requests a translation of the selected communication and returns the communication to the user. The method is controlled by a translation manager that obtains the translation and directs transmission of the translation to the user.

A single-click translation system for working the method is also described.

28 Claims, 6 Drawing Sheets

TRANSLATION ORDERING SYSTEM

This invention relates to a method and system for ordering a translation via a communications network. In particular, it relates to a "one-click" ordering system for obtaining an "instant" translation of a web page, electronic mail or other electronic communication.

BACKGROUND TO THE INVENTION

The Internet is an international communications network that links computers all over the world. Individuals and businesses can access the Internet for exchange of information and conduct of business. New ways of utilizing the Internet are being launched virtually every day but most rely on exchange of information via established protocols and services such as electronic mail and the World Wide Web.

The World Wide Web (WWW or the Web) facilitates exchange of graphical and textual information by transmitting web pages from a server computer to a client computer. Each page, or part of a page, is typically stored in a file. Each file or collection of files is considered as a resource which can be located by a unique identifier known as a Universal Resource Locator (URL). When the URL is known the corresponding resource can be requested, located and displayed on the client computer using a protocol such as HyperText Transfer Protocol (HTTP).

The URL is also important for creating links between web pages. Web pages are generally written using HyperText Markup Language (HTML). HTML provides a standard set of commands and functions that define how a web page will display. A URL can be embedded in a web page as an active link to be followed by, for example, clicking on the link. By "clicking" is meant positioning a mouse pointer over the link and pressing one of the mouse buttons. Conventionally the left mouse button is pressed to follow a link and the right mouse button (when available) is used to choose from a menu of options.

The Web and the Internet have become almost ubiquitous in world-wide availability. As a result, new modes of business and information exchange have developed. It is now possible to purchase a wide range of products via the Web. It is also possible to communicate almost instantly to almost anywhere in the world using the Internet.

The only substantial barrier to global trade is language difference. The problem of language has been addressed by web sites dedicated to providing electronic and/or human translations of electronic communications. A communication processing system that provides transparent translation of electronic communications is described in co-pending International application number PCT/AU00/00783, filed by the present applicant.

Apart from the system described in the co-pending application, there are numerous web sites dedicated to providing electronic translation. Universally, these web sites require a visit to the site and the making of an electronic request that defines the communication to be translated. Commercial sites often require the provision of billing information to authorize payment for the translation by the requester. These translation services are not user friendly since a large number of keystrokes are required by a user before the desired translation can be obtained. Furthermore, the process is time consuming whereas recent trends in web applications demand rapid response. It would be preferable to avoid the need to leave the site you are on and go to the translation site. This acts as a major disincentive to a purchaser who seeks a product from a foreign language web page. Rather than complete all the steps necessary to obtain a translation of the web page, the potential purchaser will seek another web trader.

In order to overcome the language barrier a request for translation must be made as simple and expeditious as possible.

DISCLOSURE OF THE INVENTION

In one form, although it need not be the only or indeed the broadest form, the invention resides in a method of ordering a translation of an electronic communication including the steps of:
displaying simultaneously to a user:
at least part of said electronic communication; and
a one-click translation component, said translation component comprising an object identified as effecting a translation of said electronic communication;
said user clicking said one-click translation component to request translation of said electronic communication;
said one-click translation component requesting a translation of said electronic communication by transmitting said electronic communication, or an indicator of said electronic communication, to a translation manager;
said translation manager obtaining a translation of said electronic communication; and
said translation manager directing transmission of said translation of said electronic communication to said user.

The method may further include the step of the user providing translation parameters such as the target language.

In a further form, the invention resides in a single-click translation ordering system comprising:
a one-click translation component displayed simultaneously with at least part of an electronic communication, said translation component comprising an object identified as effecting a translation of said electronic communication;
a translation manager in communication with said one-click translation component via a communication network, said translation manager obtaining a translation of said electronic communication in response to a user clicking said one-click translation component, and directing transmission of said translation of said electronic communication to the user.

DETAILED DESCRIPTION OF THE DRAWINGS

Figure 1:
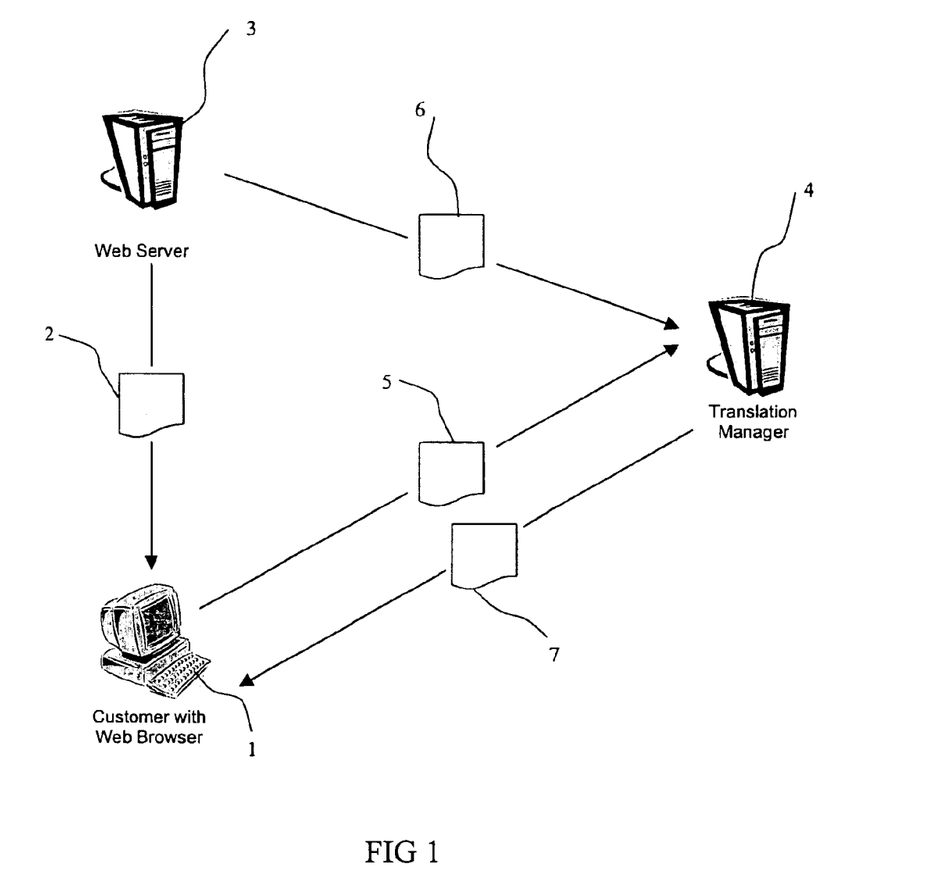
FIG. 1 shows a schematic of a translation ordering system.

Referring to FIG. 1, there is shown a schematic of a translation ordering system. A customer 1 requests a web page 2 from a web server 3. The web server 3 sends the requested page 2 to the customer's Internet browser. The web page 2 is displayed by the browser and the customer 1 determines if a translation is required. If a translation is required it is requested with a single action, as described below. A number of different embodiments are described below for a one click component for performing the single action. Whatever the particular embodiment, the result is always similar.

Once the translation is requested by a single action, the web page, a selected part of the web page, the URL of the web page or other indicator is transferred 5 to a translation manager 4. It is not normally required to translate graphics so when transferring the data to be translated the graphics may not usually be transferred. In this way bandwidth demands are not as great and the translation will be returned more quickly.

Bandwidth may also be reduced by recognizing that web pages consist of both static and dynamic content. For example, a news site will have static heading content but dynamic news content. The static content can be translated once and cached whereas the dynamic content must be translated each time a translation is requested.

Rather than transferring the web page, the URL or other indicator may be provided instead. In this case, the translation manager 4 will retrieve the original web page 6 from the web server 3.

The translation manager 4 processes the request by translating the text (and possibly sound, video, graphics etc.) and optionally adding further information. The translated web page 7 is transferred to the customer's browser and displayed in the requested language. The translation manager may also replace all links in the translated web page 7 with links that point to the translation manager 4. This enables the customer to surf an entire web site, or indeed many websites because often the links on a page are to other websites, without the need to separately request translation of each page. Once translation of one page is requested, linked pages may be automatically translated (either when the link is clicked or in advance) in anticipation of the customer's needs.

Figure 2:
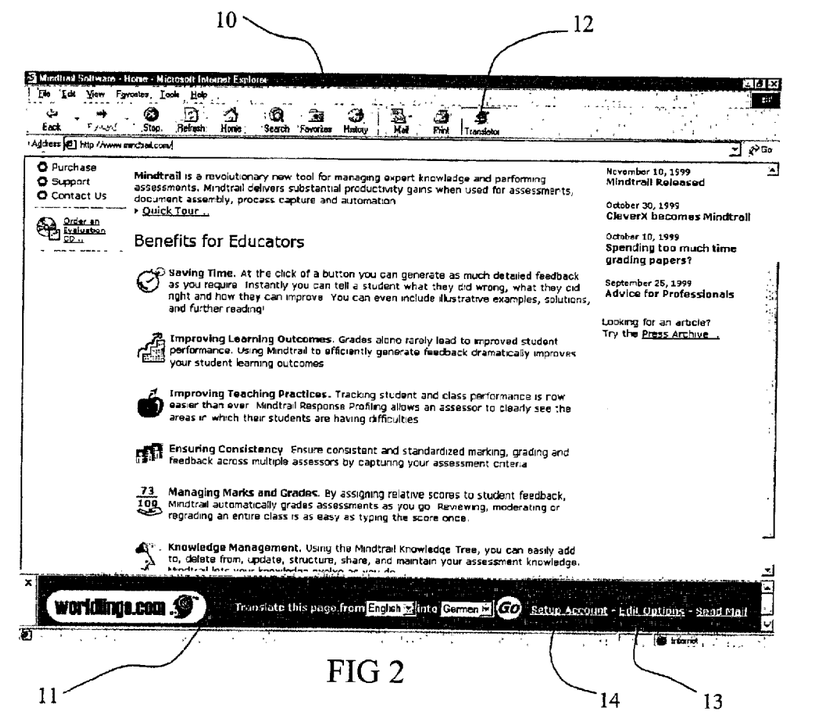
FIG. 2 shows an example of a one-click explorer bar embodiment of a translation ordering component.

The single action to request a translation can be embodied in a number of ways. One example is shown in FIG. 2. FIG. 2 shows a screen shot of a web page 10 in English. At the bottom of the screen is an explorer bar 11 that implements a one-click translation component. The one-click component indicates that the page is to be translated from the current language, in this case English, to another language, which in this example is German. The user needs only direct a mouse pointer to the "GO" button and click once or select another language from the list, for the translation to be delivered by the translation manager.

The explorer bar may always be present in the browser window but may also be invisible until the user activates the translator plug-in button 12 on the tool bar. The button 12 may also be used to activate the one-click translation facility in any of the ways described later.

It will be noted that the 'from language' and 'to language' are contained in pull-down lists. This allows the user to select different translation options. Various other options can be selected with the "Edit Options" link 13. These options might include an area of specialty e.g. medical for medical web pages, a specific dictionary, glossary, a specific translator (machine or human) to be used, the level of confidentiality required, the level of quality of the translation required, whether to edit or proof read, a time frame when the translation is required in the case of human translation, etc.

The amount of user interaction that is required will diminish through use. Once the options are set up there is only a requirement to click the one-click component to initiate the translation. It is anticipated that 'smart' icons will be employed that 'learn' user preferences through use thus further diminishing any need for user interaction other than through the one-click component.

Payment for the translation may be effected in one of many ways including:

(a) The owner of the web page may pay for all translations;
(b) The owner of the web page may pay a fee to be able to place the web translation component on that web page or part thereof.
(c) An advertiser may pay a fee to a web site owner to include the web translation component with the paid advertisement. The website owner may then pay this fee, or a part thereof, to the translation service that provides the translation component;
(d) The user may pay for the translation; or
(e) It may be free and supported by advertising and sponsorship.

If (d) applies, it will be necessary for the user to set up account details before the translation can be made. In the example shown in FIG. 2, (d) applies and the user will set up account details using the "Setup Account" link 14. To set up an account the client would be required to provided a variety of information which could include, but is not limited to:

Name;
Address;
Phone Number;
Fax number;
Email Address;
Preferred Password;
Security information that can be used to identify the user in case they forget their password;
Preferred payment method e.g. credit card, purchase order, bank transfer, etc;
Demographic information;
Information about the types of things that get translated e.g. medical industry, email, research reports etc;
Preferences regarding the nature of the translation e.g. formal, informal, business, etc;
Preferred quality level;
The level of editing and/or proof reading required;
Language pairs for which translation is required and the email address where each translation should be sent;
Preferred turnaround times;
Confidentiality Level;
Do not translate (DNT) lists
Customer specific dictionaries (CSD).

If (a) (b), (c) or (e) applies there is no action required by the customer other than to click once on the one-click translation component.

The explorer bar 11 is implemented as an Internet browser plug-in and therefore integrates with the users browser, such as Microsoft's Internet Explorer® or Netscape's Navigator®. Compared to prior art solutions, the explorer bar 11 has the unique ability to communicate with the web browser to gain access to the required details of the current web page. It can also allow saving options and preferences on the customer's local computer as well as supporting the translation of web pages or text selections by just one mouse click.

Prior art solutions require multiple mouse clicks to achieve the same result. Most often the customer is merely transferred to a common web page that is used for copy and paste translations at the translators web site. The language then has to be selected and the translation process started manually through the customer's interaction. The prior art approach requires an unacceptable number of actions by the user as well as time delays while waiting for web pages to load.

The translation manager 4 may store translation programs for effecting automatic translation of the identified web page. Alternatively, the translation manager may simply manage the process by transmitting the web page to another translation site. In this case the translated communication may be returned to the translation manager for transmission to the user or alternatively the translation manager may append routing information to the communication that directs the transmission of the translated communication to the user.

In some cases, a suitable translation engine will not be available and it will be necessary for the document to be translated by a human. This requirement will be notified to the customer by the translation manager and the translation process initiated or delayed until approved by the customer. The translation manager appends identifying data to the transmission in order to correctly return and display the translated material. The identifying data may include a job number that uniquely addresses a specific translation job.

Figure 3:
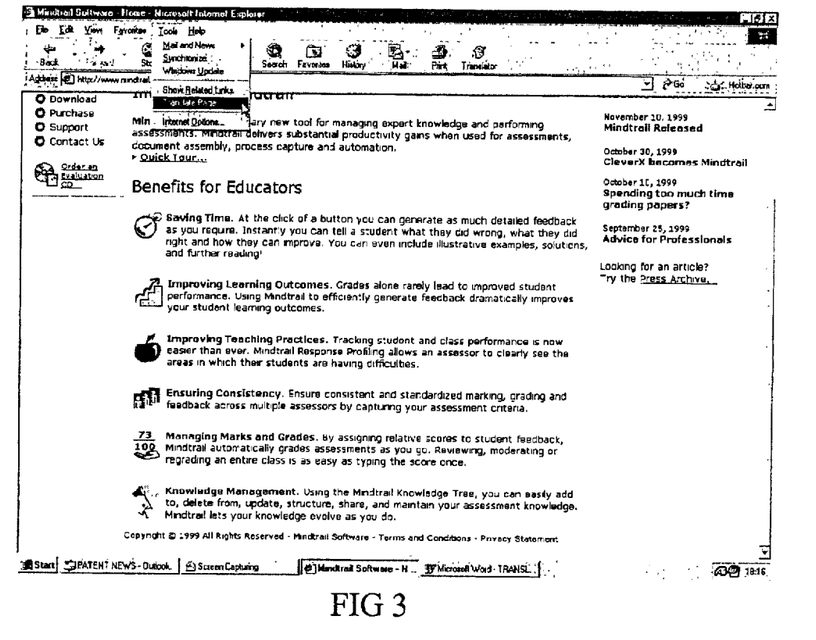
FIG. 3 shows an example of a tool bar embodiment of a translation ordering component.
Figure 4:
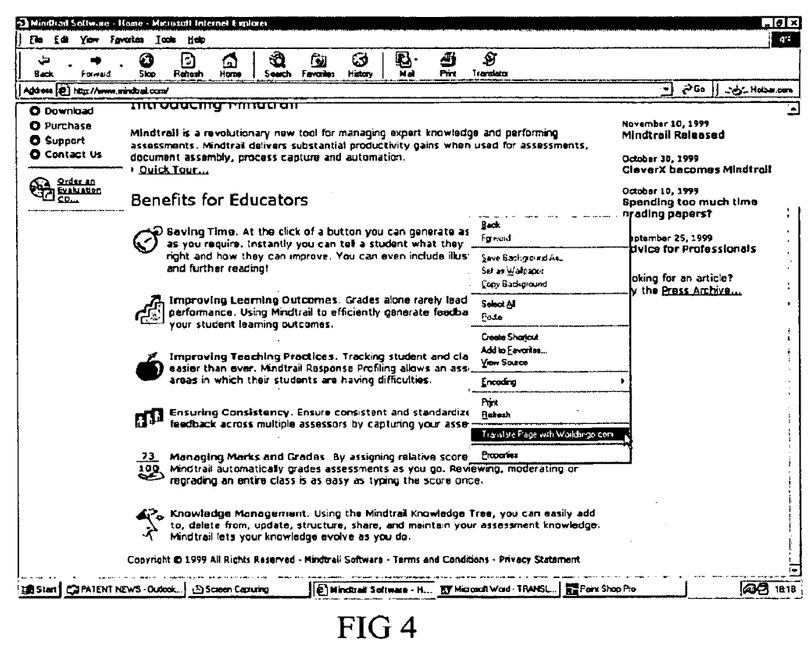
FIG. 4 shows an example of a context menu embodiment of a translation ordering component.
Figure 5:
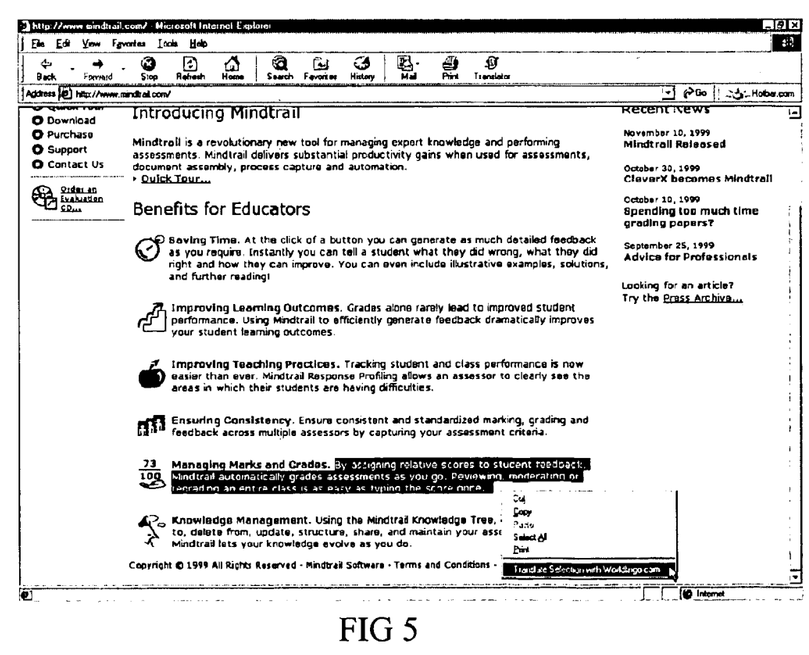
FIG. 5 shows a further example of a context menu embodiment of a translation ordering component.

The explorer bar 11 is only one embodiment of the one-click translation component. The content of the explorer bar 11 may be embodied as menu items in the customers' browser. For example, the tools menu of Microsoft's Internet Explorers may include a menu item as shown in FIG. 3 which allows selection of "Translate this page", or if text has been selected, "Translate selected text". The one-click translation component may also be a context menu as shown in FIG. 4, activated by clicking the right mouse button to translate the page. If text has been selected the context menu will give the option to "Translate selection", as shown in FIG. 5. Such components will be known to persons skilled in the art of programming for web pages.

Figure 6:
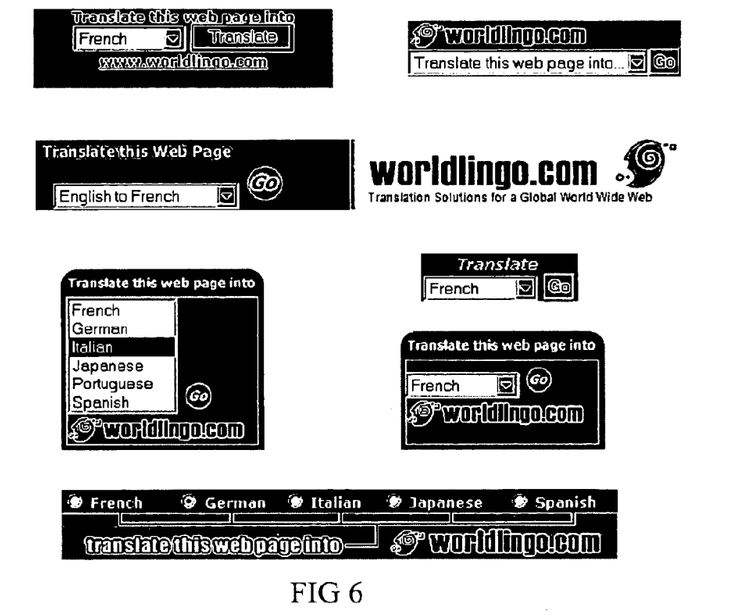
FIG. 6 shows other embodiments of translation ordering components.

Other embodiments, in the form of pull down lists, buttons and bars are shown in FIG. 6. The webmaster (person responsible for construction and management of the web page) can include pre-built HTML and JavaScript code into their web pages to instantaneously enable a one-click translation component.

The banners and buttons of FIG. 6 are automated to provide a one-click component for requesting translation, ie. all the customer has to do to translate the current web page, email, or other form of electronic communication is select the target language. Because the encoding of the web page and the source language are already known and preset when the webmaster includes the one-click translation component, it is sufficient at this stage just to choose the target language. The translated page will still contain the one-click translation component, so another selection of a target language will invoke the process again.

Another embodiment could be a hypertext link that includes an indicator of the web page or other communication to be translated and an indicator of the language to be used for the translation. A web page could include a different hypertext link for each language and the user simply clicks on the appropriate link to initiate translation of the page into the desired language. This embodiment is particularly useful for other forms of communication, such as text based email which do not support the full functionality of web pages but do support hypertext links.

Figure 7:
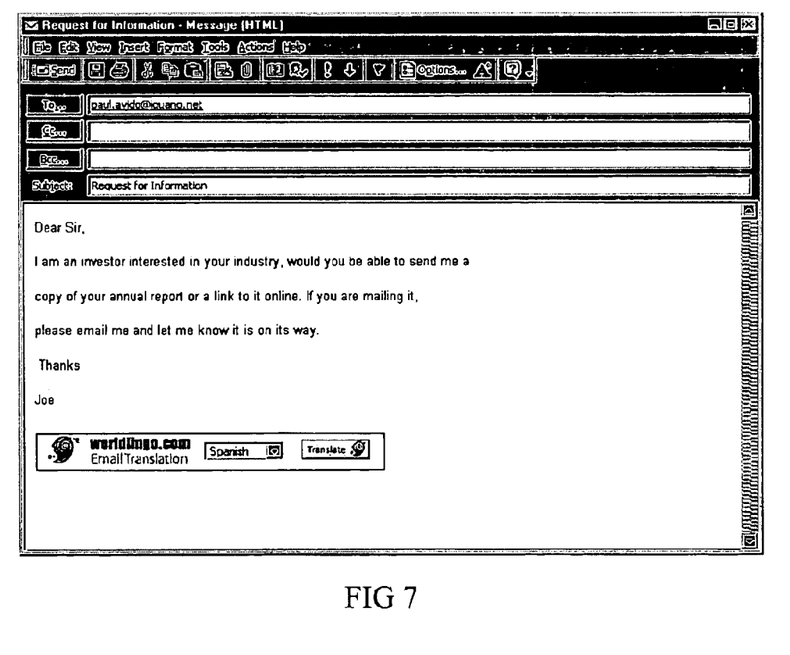
FIG. 7 shows a translation ordering component for HTML email.
Figure 8:
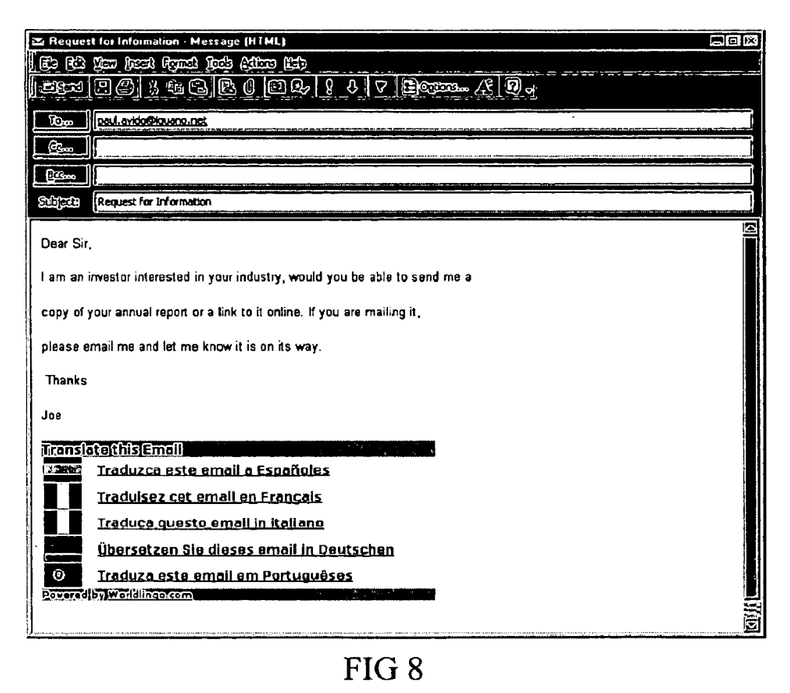
FIG. 8 shows another translation ordering component for HTML email.
Figure 9:
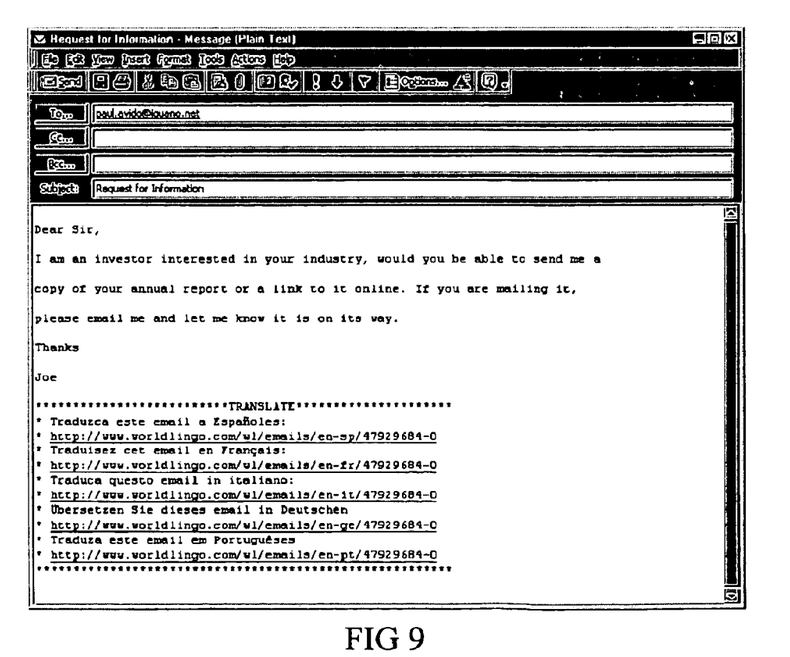
FIG. 9 shows a translation ordering component for text email.

Examples of a translation component embedded in the body of an HTML email are shown in FIG. 7 and FIG. 8. FIG. 7 shows an object that incorporates the pull down menu object discussed earlier. FIG. 8 shows an alternative where the available translation options are listed in an object. FIG. 9 shows an embodiment in which translation links are placed in the body of a text email.

The one-click translation components may operate in a number of ways depending on the location of the email. If the email is stored on the local machine the one-click component operates to transmit the email to the translation manager. If the email is left on the server of the ISP, the one-click component may transmit an indicator of the email, such as a file location. Another possibility is that the email is stored on a server on a LAN, in which case either approach may be possible.

As mentioned above, and as will be appreciated by persons skilled in the use and programming of web pages and/or software, the described functions can be provided by plug-in applications or stand alone programs that interact either actively or passively with the viewed web pages (or data containers in software applications e.g. fields, memo fields, Blobs, documents, workbooks, windows, dialog boxes, record, etc.) and communicate with the translation manager via the Internet to request translation in response to a keystroke, mouse action, voice command, or other method by the customer.

Figure 10:
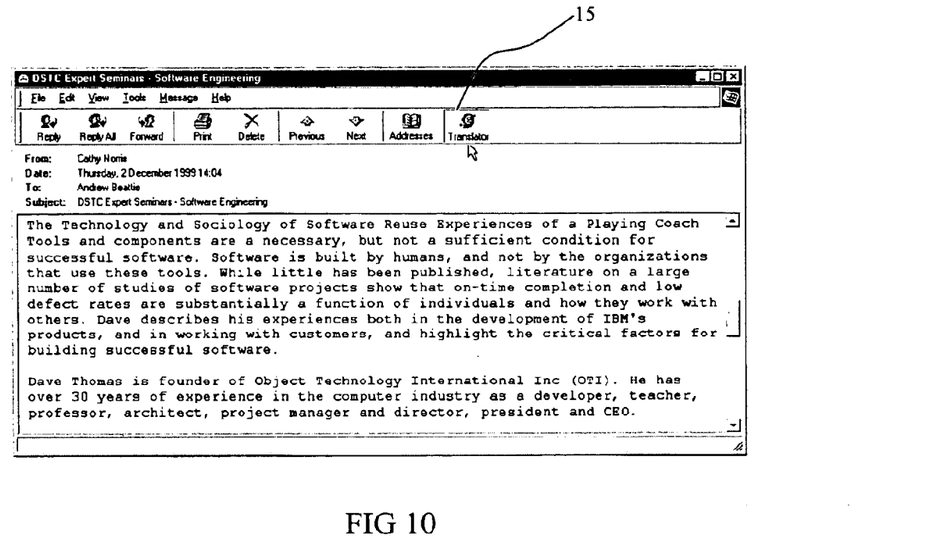
FIG. 10 shows an example of translation ordering component embodied for email translation.

As previously described, the one-click translation component is not restricted to operating in a web environment. For example it may also be embodied as an add-in for translation of electronic mail, as shown in FIG. 10. The tool 15 appears on the tool bar of the email client e.g. Microsoft Outlook or Eudora. With a single action, such as the click of a mouse button, a customer may send a message to the translation manager 4 for translation and optionally forwarding to the intended recipient or returning to the requester. In this embodiment, the customer may save default account information as previously discussed.

The invention can be applied to virtually any software. In one embodiment, the inventor envisages that an icon (button) could be provided in one corner of the computer screen and operate directly within the operating system shell. When the item is clicked the active control or active window is sent to the translation manager for translation.

In another example an icon could be added to the tool bar of applications that commonly deal with documents like WINZIP. So when unzipping a file it is translated automatically with one click.

Another application applies to computer classifieds. Users could pay a small additional amount to have a translation component associated with the classified to encourage foreign language viewers to consider the classified.

In an extension of the one-click translation ordering system, the translation manager 4 maintains a database of statistical information about the requested translations. The statistical information is accessible by webmasters (and/or other approved parties) of web pages that have been translated in a similar way to how page visit information is currently available using cgi-bin. This statistical information provides hard data to the web site owner about which parts of their website should be translated and into which languages.

For example, if a travel website has a section on Port Douglas holidays that receives requests for translations into Japanese over a hundred times a day, it would be a clear indication to the website owner to have that part of their website professionally translated into Japanese. It may also affect the sites product mix. Based on this statistical data the website owner might include more Port Douglas destinations with Japanese speaking staff, menus, etc. than they had before.

The key benefit of this aspect of the invention is that it helps the website owner to make better business decisions based upon the actual language preferences of visitors to their website.

Another use for this statistical data is as a marketing tool. The statistical data can be used by a website localization business to convince a potential client to have their website localized into say Japanese. The data may also highlight other languages the website should be localized into thus helping to gain more business.

Yet another use of the statistical information is to determine the language preference of a user, so that it is possible to communicate in the users preferred language, irrespective of the source language. It has been found that people are three to four times more likely to initiate a purchase when communicated with in their native tongue. The ability to communicate with a potential customer in their preferred language can translate to a substantial increase in sales.

The statistical information could be used in a bureau service wherein a commercial or bulk email provides a list of email addresses for intended recipients. The addresses would be run against a database of user preferences and the recipients preferred language provided for each email. A customized translation component could then be included in the email and/or the message translated into the preferred language. The bureau would be able to charge a fee for this service.

The inventor perceives that the invention can be extended in this (and other) applications, to provide currency translations. The translation manager 4 may access current or historical currency exchange rates to convert fees and charges to a currency suitable for the user. For example, if a communication were being converted to Chinese all currency references would be converted to yen and the cost of the translation could be billed in yen, or any other suitable currency.

The one-click translation ordering system can form a key component of revenue sharing programs such as those commonly known on the internet as affiliate or associate programs. Under these programs, the site (and this can be extended to software packages on computers that are connected to the internet at least occasionally) offering the service or product for sale pays an amount of money to other sites who advertise or promote their service or product. This amount of money is calculated on a per impression basis (an amount for each time an advertisement such as a button, banner, or text description is displayed), a per click basis (an amount for each time someone clicks on the advertisement to visit the site offering the product or service), a per lead basis (an amount for each time a visitor clicks on an advertisement and fills out say an inquiry form), or a per sale basis (an amount for each time the visitor clicks on an advertisement and actually buys something from the site offering the product or service—this could be a fixed amount or a variable amount such as a percentage). These programs can be multi-tier i.e. each participant may get a share of the revenue derived from people they refer to join the affiliate program. They can be set up to only pay on sales generated on that particular visit, or for a fixed period after that visit, say 90 days, or for life.

A person skilled in the art would be aware of the myriad of ways these revenue sharing schemes can be set up. There are many variations in terms of how the revenue shared is calculated; what advertisements are available; what medium you can advertise on e.g. web pages, emails, newsletters, brochures, newsgroups, software, signature files, etc.; and many other attributes of the program.

The one-click translation ordering system when integrated with such a revenue sharing program has several advantages over competing offers in terms of the value it adds to the website in addition to the revenue sharing opportunities. The added value includes the statistical data that helps the web site owner determine which parts of the website should be localized into which languages based on actual demand from users. Research has found that a visitor is three to four times more likely to buy something from a site in their native language versus a non-native language, so the value added includes the increased sales that are likely to be generated by the site.

The one-click translation ordering system returns additional value to the owners of web pages that elect to embed a one-click translation component on their web page. Members of the affiliate program receive a commission statement indicating the number of translations made as well as recommendations on which pages should be permanently translated and into which languages. The inventor envisages that this facility can greatly enhance the effectiveness of web based marketing by the affiliate member.

The affiliate member may also receive a commission on translations paid for by their customers. This information is tracked by the translation manager 4.

Figure 11:
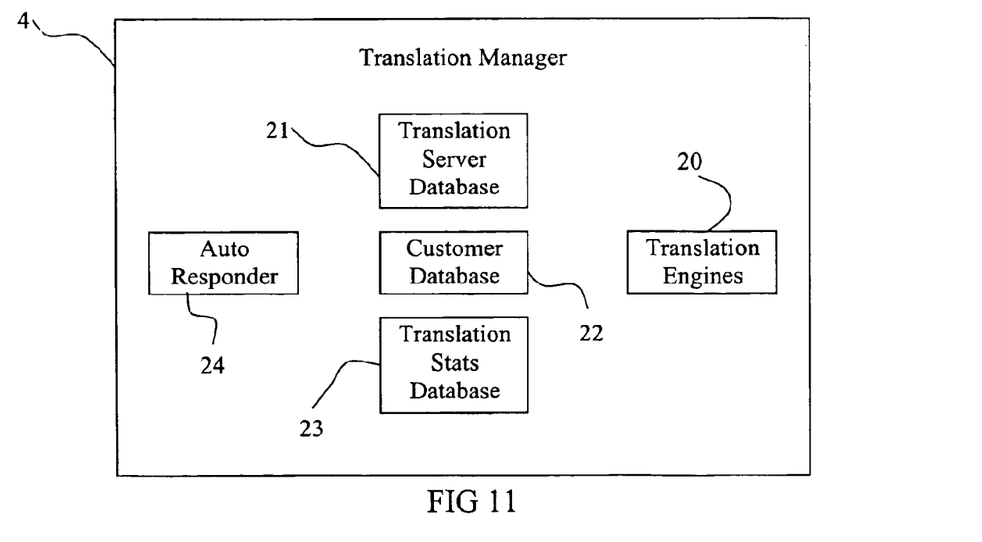
FIG. 11 is a block diagram of one embodiment of a translation manager.

One possible embodiment of the functional components of the translation manager 4 is shown in FIG. 11. As mentioned above, the translation manager 4 may include translation engines 20 for performing the required translations. A database 21 of available translation servers may also be maintained and the translation manager 4 will direct requested translations to the appropriate server. It is also necessary for the translation manager 4 to maintain a customer database 22 for accounting purposes. Statistics on translations performed are maintained in another database 23 for internal management and affiliate program purposes. The translation manager 4 also includes an auto-responder 24 for sending messages to the customer and to webmasters of affiliate web page owners.

Throughout this specification the aim has been to describe the preferred embodiments of the invention without limiting the invention to any one embodiment or specific collection of features.

What is claimed is:

1. A method of ordering a translation of an electronic communication, the electronic communication comprising at least text of more than one word and one or more hyperlinks to further electronic communications, including the steps of:

displaying simultaneously to a user:
   at least part of said electronic communication; and
   a single action translation component, said single action translation component comprising an object identified as effecting a translation of said electronic communication in a single action;

said user clicking said single action translation component to request translation of at least said text of said electronic communication by transmitting said electronic communication, or an indicator of said electronic communication, to a translation manager; and said translation manager:

obtaining a translation of said electronic communication;

directing transmission of said translation of said electronic communication to said user; and providing translation of said further electronic communications when said hyperlink is activated:
by delivering a translation of said further electronic communications that was translated when said electronic communication was translated; or
by obtaining a translation of said further electronic communications when said hyperlink is activated.

2. The method of claim 1 further including the step of said user providing translation parameters.

3. The method of claim 2 wherein said translation parameters include a target language.

4. The method of claim 1 wherein the step of transmitting involves transmitting one of: a URL of a web page; a selected part of a web page; or the web page.

5. The method of claim 1 wherein clicking said single action translation component transmits one of: an email; a part of an email; or a location of an email.

6. The method of claim 1 further including the step of said translation manager appending further information to said translation.

7. The method of claim 6 wherein said further information is identifying information for correctly returning said translation to said user.

8. The method of claim 1 further including the step of reducing bandwidth demands by recognizing content of said electronic communication as either static or dynamic content and caching translated static content for future use.

9. The method of claim 1 wherein said single action translation component comprises a smart icon capable of learning user preferences through use by said user.

10. The method of claim 1 further including the step of the translation manager translating currency amounts to equivalent amounts in a user currency.

11. The method of claim 1 further including the step of compiling statistical information about said translation manager.

12. The method of claim 1 further including the step of said translation manager maintaining user information.

13. The method of claim 1 further including the step of effecting payment for said translation.

14. The method of claim 13 wherein payment for said translation is effected by an originator of said communication paying a fee for displaying said single action translation component.

15. The method of claim 13 wherein payment for said translation is effected by an originator of said communication selling advertising space to an advertiser for a fee and paying said fee, or part of said fee, for displaying said single action translation component.

16. The method of claim 1 further including the step of caching translation of static content of said electronic communication or said further electronic communications.

17. A single-action translation ordering system comprising:

a single action translation component displayed simultaneously with at least part of an electronic communication comprising at least text of more than one word and one or more hyperlinks to further electronic communications, said translation component comprising an object identified as effecting a translation of said electronic communication in a single action;

a communication network; and a translation manager in communication with said single action translation component via said communication network;

said translation manager:
obtaining a translation of said electronic communication in response to a user clicking said single action translation component;
directing transmission of said translation of said electronic communication to said user; and
providing translation of said further electronic communications when said hyperlink is activated:
by delivering a translation of said further electronic communications that was translated when said electronic communication was translated; or
by obtaining a translation of said further electronic communications when said hyperlink is activated.

18. The system of claim 17 wherein said single action translation component is selected from a list including: an explorer bar, a pull-down menu, context menu, or a button.

19. The system of claim 17 wherein said single action translation component comprises an add-in application for an electronic mail program.

20. The system of claim 17 wherein said single action translation component comprises an application operating within an operating system for translating communications within the operating system.

21. The system of claim 17 further comprising means for said user to input translation parameters.

22. The system of claim 17 wherein said translation manager includes means for effecting automatic translation of said communication.

23. The system of claim 17 further comprising means for compiling statistical information about said system.

24. The system of claim 17 further comprising means for translating currency amounts to equivalent amounts in a user currency.

25. The system of claim 17 further comprising means for maintaining user information.

26. A translation manager for a single action translation system, said translation manager comprising:

means for receiving an electronic communication in response to clicking a single action translation component displayed simultaneously with at least part of said electronic communication, the electronic communication comprising at least text of more than one word and one or more hyperlinks to further electronic communications, said translation component comprising an object identified as effecting a translation of said electronic communication in a single action;

one or more translation engines translating said electronic communication and said further electronic communications according to parameters; and means for returning a translation of said electronic communication; and means for returning a translation of said further electronic communications when said hyperlink is activated.

27. The translation manager of claim 26 further comprising means for compiling translation statistics.

28. The translation manager of claim 26 further comprising means for maintaining user information.

* * * * *

(12) INTER PARTES REEXAMINATION CERTIFICATE (1242nd)
United States Patent
Scanlan (10) Number: US 6,857,022 C1
(45) Certificate Issued: Mar. 15, 2016

(54) TRANSLATION ORDERING SYSTEM (75) Inventor: Phillip Lee Scanlan, Brisbane (AU)

(73) Assignee: Transperfect Global, Inc.

Reexamination Request:
No. 95/002,372, Sep. 14, 2012

Reexamination Certificate for:
Patent No.: 6,857,022
Issued: Feb. 15, 2005
Appl. No.: 09/676,690
Filed: Sep. 29, 2000

(30) Foreign Application Priority Data

Feb. 2, 2000 (AU) ........................ PQ5397

(51) Int. Cl.
*G06F 17/28* (2006.01)
(52) U.S. Cl.
CPC .......... *G06F 17/2836* (2013.01); *G06F 17/289* (2013.01)

(58) Field of Classification Search
None
See application file for complete search history.

(56) References Cited

To view the complete listing of prior art documents cited during the proceeding for Reexamination Control Number 95/002,372, please refer to the USPTO's public Patent Application Information Retrieval (PAIR) system under the Display References tab.

*Primary Examiner* — Ovidio Escalante (57) ABSTRACT

A method of ordering a translation of an electronic communication, such as a web page or an email, using a one-click translation component displayed on the web page or in the email. Clicking the one-click translation component automatically requests a translation of the selected communication and returns the communication to the user. The method is controlled by a translation manager that obtains the translation and directs transmission of the translation to the user. A single-click translation system for working the method is also described.

INTER PARTES REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-28 is confirmed.

New claims 29-52 are added and determined to be patentable.

29. *The method of claim 11, further comprising:*
   *determining a popularity of a particular translation request from the statistical information.*
30. *The method of claim 29, further comprising:*
   *dedicating additional resources to translating electronic communications associated with the particular translation request based on the popularity of the particular translation request.*
31. *The method of claim 12, wherein maintaining user information further comprises:*
   *setting up an account configured to store translation preferences for the user.*
32. *The method of claim 31, wherein displaying the single action translation component comprises:*
   *displaying the single action translation component based on the translation preferences for the user.*
33. *The method of claim 31, wherein the translation preferences include a quality level.*
34. *The method of claim 1, wherein obtaining a translation of said electronic communication comprises:*
   *localizing the electronic communication.*
35. *The method of claim 34, wherein localizing the electronic communication comprises:*
   *converting currency information in the electronic communication to a local currency.*
36. *The method of claim 1, wherein obtaining a translation of said electronic communication comprises:*
   *obtaining the translation of said electronic communication using a selected translator.*
37. *The method of claim 36, wherein obtaining the translation of said electronic communication using the selected translator comprises:*
   *obtaining the translation of said electronic communication using a profession-specific translator, a glossary, or a user-specified dictionary or translator.*
38. *The method of claim 1, further comprising:*
   *receiving translation parameters.*
39. *The method of claim 38, wherein said translation parameters include a target language.*
40. *The system of claim 17, wherein said translation manager obtaining a translation of said electronic communication comprises:*
   *said translation manager localizing the electronic communication.*
41. *The system of claim 40, wherein said translation manager localizing the electronic communication comprises:*
   *said translation manager converting currency information in the electronic communication to a local currency.*
42. *The system of claim 17, wherein said translation manager obtaining a translation of said electronic communication comprises:*
   *said translation manager obtaining the translation of said electronic communication using a selected translator.*
43. *The system of claim 42, wherein said translation manager obtaining the translation of said electronic communication using the selected translator comprises:*
   *said translation manager obtaining the translation of said electronic communication using a profession-specific translator, a glossary, or a user-specified dictionary or translator.*
44. *The system of claim 17, said translation manager receiving translation parameters.*
45. *The system of claim 44, wherein said translation parameters include a target language.*
46. *The system of claim 17, wherein the translation manager is configured to differentiate between static and dynamic content of the electronic communication, and to selectively cache the static content.*
47. *The translation manager of claim 26, wherein said one or more translation engines translating said electronic communication comprises:*
   *said one or more translation engines localizing the electronic communication.*
48. *The translation manager of claim 47, wherein said one or more translation engines localizing the electronic communication comprises:*
   *said one or more translation engines converting currency information in the electronic communication to a local currency.*
49. *The translation manager of claim 26, wherein said one or more translation engines translating said electronic communication comprises:*
   *said one or more translation engines obtaining the translation of said electronic communication using a selected translator.*
50. *The translation manager of claim 49, wherein said one or more translation engines obtaining the translation of said electronic communication using the selected translator comprises:*
   *said one or more translation engines obtaining the translation of said electronic communication using a profession-specific translator, a glossary, or a user-specified dictionary or translator.*
51. *The translation manager of claim 26, said one or more translation engines receiving translation parameters.*
52. *The translation manager of claim 51, wherein said translation parameters include a target language.*

\* \* \* \* \*